C. ALLEN.
ROAD GRADING AND BUILDING MACHINE.
APPLICATION FILED SEPT. 16, 1915.
1,259,710.
Patented Mar. 19, 1918.
3 SHEETS—SHEET 1.
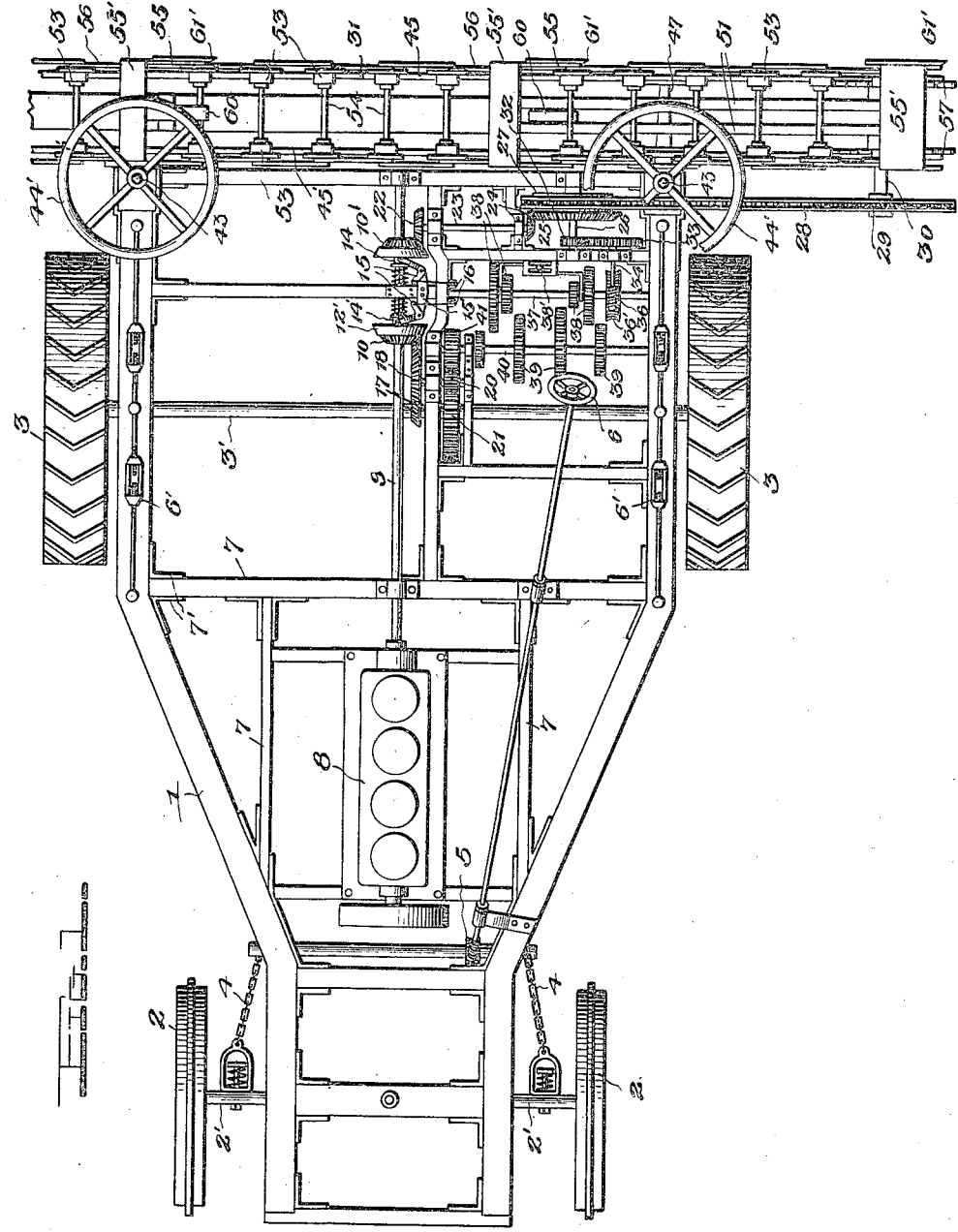
Inventor
Clay Allen
By Bacon Milans
Attorney

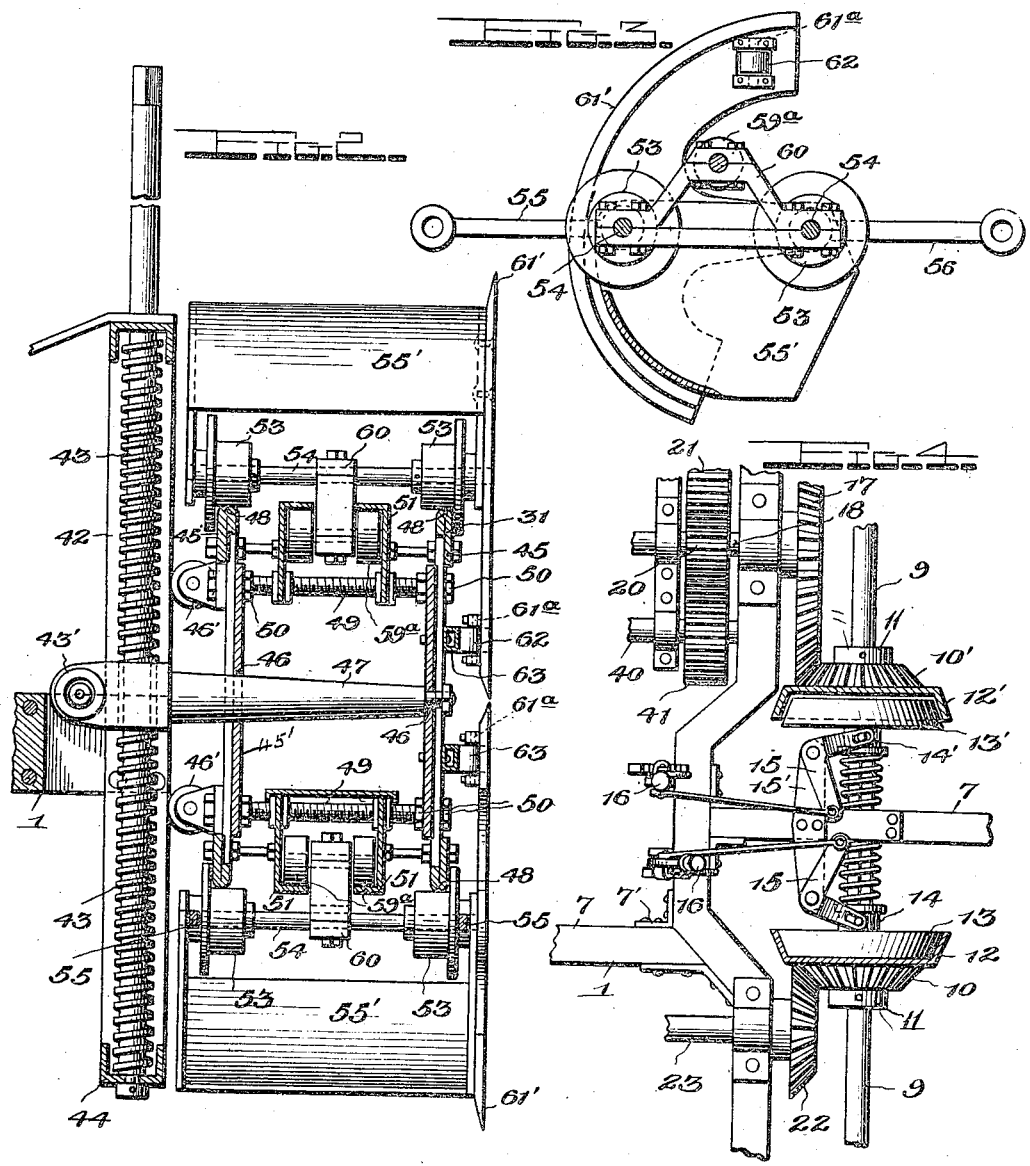

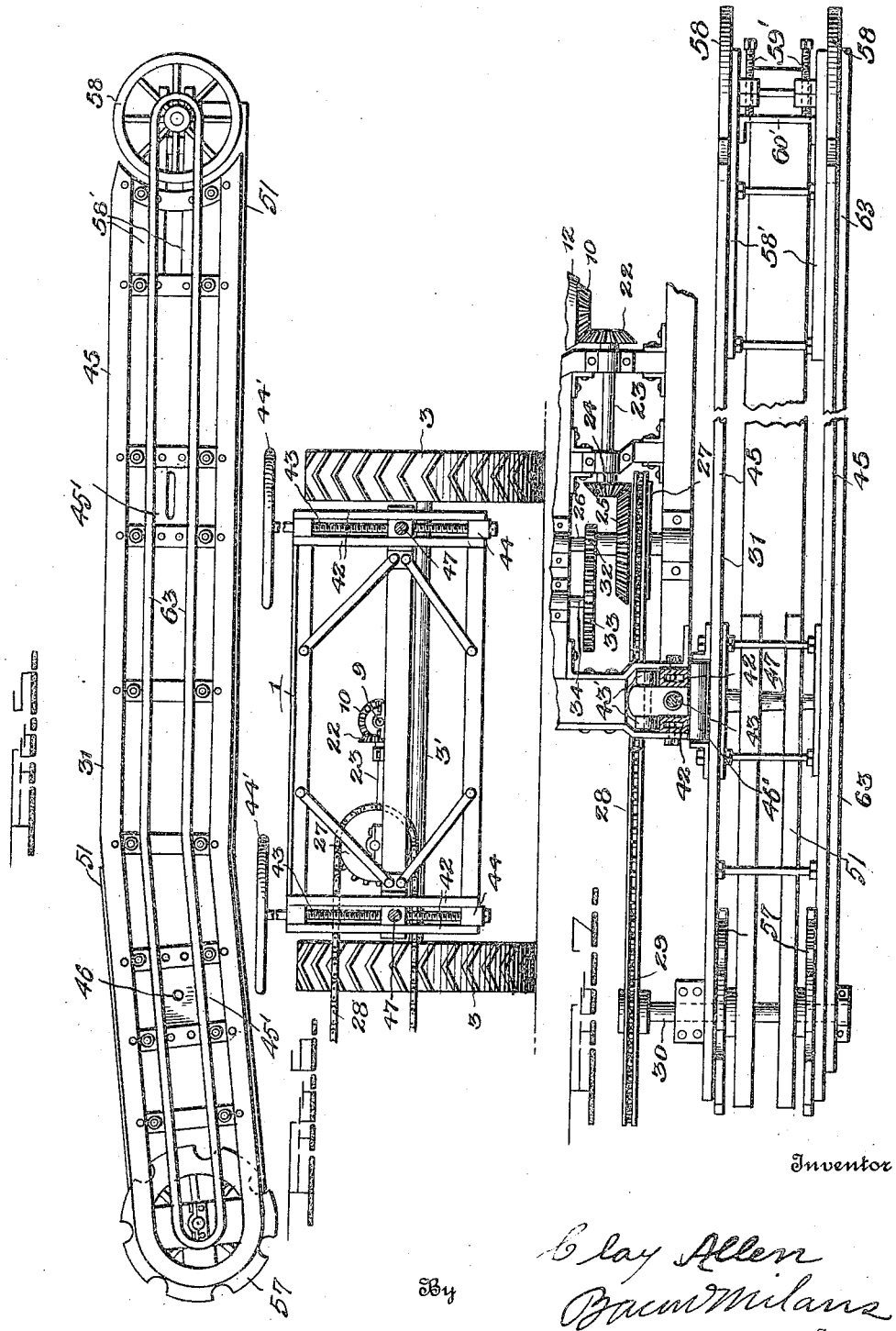

UNITED STATES PATENT OFFICE.

CLAY ALLEN, OF BLAIRSTOWN, MISSOURI.

ROAD GRADING AND BUILDING MACHINE.

1,259,710.

Specification of Letters Patent. Patented Mar. 19, 1918.

Application filed September 16, 1915. Serial No. 51,002.

*To all whom it may concern:*

Be it known that I, CLAY ALLEN, citizen of the United States, residing at Blairstown in the county of Henry and State of Missouri, have invented certain new and useful Improvements in Road Grading and Building Machines, of which the following is a specification, reference being had therein to the accompanying drawing.

The invention relates to improvements in a road grading and building machine, particularly to that type of machine that carries the earth from the side of the road to the center to build up that portion of the road whereby the road is built up where necessary and perfect drainage afforded.

The invention has for its object the provision of a machine of the character described comprising a suitable wheeled truck carrying an endless conveyer driven by power means arranged on the truck, the endless conveyer being provided with a series of scraping members that pass transversely across the road to the center thereof, building up the center and automatically putting the material where it is needed to fill irregularities in the sides of the road.

A further object of the invention is to construct a machine which when in operation moves rearwardly, the scraping mechanism being carried by the rear portion of the machine and at all times cutting and leveling the road in advance of the wheeled truck so that the truck at all times remains on level ground eliminating the continual adjustment of the scraping mechanism due to the ordinary irregularities in the surface of the ground over which the truck of the usual construction passes.

A still further object of the invention is the provision of a driving mechanism between the engine carried by the truck and the differential gearing arranged on the truck axle and scraping mechanism whereby the machine is driven a predetermined distance in keeping with the travel of the scrapers so that the movement of the machine with reference to the transverse scrapers can be varied to allow the successful working of the apparatus on roads of different degrees of hardness, such for instance as roads composed entirely of earth as well as roads containing gravel or the like, it being apparent that less cutting action is required and therefore a more rapid movement of the machine is permitted when the same is working on plain earth, than when gravel is acted upon which requires the slow movement of the machine and a vast amount of cutting.

Figure 1 is a top plan view.

Fig. 2 is a sectional view of the scraping frame.

Figs. 3—4 are detail views.

Fig. 5 is a view of the conveyer frame.

Figs. 6—7 are views of the different detail parts of the machine.

Referring now more particularly to the drawings wherein like numerals indicate corresponding parts, the numeral 1 designates the frame of the truck reduced in width at the front thereof and provided with front and rear wheels 2 and 3 arranged on front axles 2' and 3', the front axles being pivotally attached to the frame to permit the steering of the machine and having guiding chains 4 attached to the worm and cog steering gear leading to the worm and cog steering gear 5 controlled by the steering wheel 6. This gear is of the ordinary construction and it will be readily seen that any suitable type of steering mechanism can be used. The frame is provided with a series of longitudinal and transverse reinforcing bars 7, fastened to each other and the frame by means of angle irons 7', the reinforcing bars also constituting mountings for different elements of the machine to be later described. A pair of truss rods 6' are arranged on the frame of the machine on each side thereof near one end to assist in supporting the weight of the conveyer or frame attached to the rear of the truck.

Mounted on the forward part of the frame and supported by the longitudinal reinforcing bars is a power driven engine 8, a gas or oil engine, being preferably used, having a driving shaft 9 extending to the rear of the machine and upon which are loosely mounted the oppositely disposed beveled gears 10 and 10', held against movement in one direction by the collars 11 keyed to the shaft and rotatable therewith. The bevel gears 10 and 10' carry the dished clutches 12 and 12' into which the beveled clutch members 13 and 13' fit, these clutch members being spring pressed and independent of each other. The clutch members are fastened to the sliding collars 14 and 14' having square openings therethrough fitting the shaft that is square in shape the entire distance between the beveled gear 10 and 10' so that the clutch members rotate with the shaft at all times, the collars 14 and 14' are slidably mounted on the shaft 9 to permit a movement thereof, and these collars receive suitable sleeves loosely mounted thereon in a manner that is well known to those skilled in the art. The clutch members are operated independent of each other so that the machine is capable of a forward or reverse movement and are controlled by the bell crank levers 15 pivotally attached to a transverse member 15' arranged on one of the reinforcing bars of the machine and operated by the handles 16 extending to any suitable place within reach of the operator.

When the machine is being transported from place to place the scrapers not being in operation, the clutch 13' is in engagement and coupled with the beveled gear 10' causing the rotation of this gear as well as the intermeshing gear wheel 17 mounted on a stub shaft 18 journaled in the frame, the stub shaft at its opposite end carrying a relatively small gear 20 meshing with the master cog wheel 21, which through the medium of the ordinary reduction gearing coöperating with the master cog wheel rotates the rear axles causing the machine to be propelled in a forward direction but in no way affecting the movement of the scraper or levelers to be later described.

When the clutch 13 is coupled with the beveled gear 10 the machine is placed in working condition, the same moving rearwardly, the cog wheel 10 meshing with the bevel gear 22, on one end of the shaft 23 journaled on the frame, the shaft at its opposite end carrying a gear 24, meshing with the gear 25, which gear in turn causes the rotation of the sprocket wheel 27 over which the chain 28 for operating the conveyer passes. The opposite end of the chain 28 drives the sprocket wheel 29 arranged on the shaft 30 supported by the conveying or scraping frame 31 by which the endless conveyer carrying the scraping buckets is driven.

The opposite end of the stub shaft 26 upon which the sprocket wheel 27 is mounted carries a gear 32 meshing with a gear 33 carried by a shaft 34, the free end of the shaft 34 being provided with a worm gear 36 engaging the periphery of the gear wheel 36' arranged on the transverse shaft 37 which is journaled within the frame, causing the rotation of this shaft. The shaft 37 carries a series of different sized gear wheels 38, slidably arranged thereon but adapted to turn with the shaft, these gear wheels coöperating with the different sized gear wheels 39 rigidly attached to the shaft 40 mounted for rotation and at its outer end is provided with a gear wheel 41 meshing with the master cog wheel 21 of the reduction gear, that in turn rotates the axle.

The gears 38 slidably mounted on the shaft 37 are manipulated by means of the controlling member 38' which is arranged to be accessible to the operator.

It will be readily seen that when the machine is in operation, at that time moving rearwardly, the chain driving the conveyer rotates at the same speed at all times according to the condition of the engine, while the movement or travel of the truck is governed by the gears 38 and 39, whereby the truck may be driven rapidly during the operation of the scrapers that transverse the road or vice versa.

Positioned on the rear of the frame 1 are the vertically extended guide members 42, each composed of a pair of spaced guide bars, one guide member being preferably arranged near each end of the frame and having a vertically extending screw threaded member 43 passing between the space bars, the lower portion of said shaft being swiveled in the stationary blocks 44 arranged at the end of each guide member, the opposite portion of the shaft being provided with an operating wheel 44'. Slidably mounted on the guide members is the adjustable scraping frame 31 extending transversely of the frame 1 and considerably beyond. The scraping frame 31 at its inner portion (or about two thirds thereof) being preferably straight, while the outer end (or one third) gradually inclines downwardly at an angle to the inner portion of the frame, for the purpose of cutting the side ditch on a different grade angle than that of the grade in the center of the road where the travel is expected to be done, allowing scrapers #55 moving the dirt to release same automatically where needed to build a perfect grade, and then continue their travel around the frame #31 to a point of starting. The frame is composed of two suitably connected parallel strips 45 constituting tracks for the endless conveyer at their edges, and connecting parts 45'; the connecting parts having pairs of axially alined apertures 46 therein for the passage of the tapered supporting bars 47 that pass between the spaced guide members 42 and have threaded apertures therethrough for the passage of the threaded shank of the adjusting screw 43. At the end these supporting bars are provided with rollers 43' journaled thereto and bearing against the inner portion of the guide members, the inner plate 45' of the frame also being provided with guide rollers 46' that bear against and ride upon the opposite sides of the spaced bars, so that it is only necessary to rotate the threaded shaft to cause the scraping frame to be raised or lowered by means of the threaded shank portions of the guide members coöperating with the threaded apertures of the supporting bars, the rollers 43' and 46' riding against the guide members and permitting the supporting frame to be antifrictionally raised or lowered. The parallel plates 45' with the remaining structure forming the frame provide one which is very light in weight, in that the same is preferably formed of strips and therefore of an open-work construction, although any other suitable type of frame could be employed if desirable. The edges of the strips 45 are rebent to form track portions 48 for the wheels of the scrapers passing thereover, comprising flanged metallic wheels rotatably mounted upon the axles 54 of a width substantially greater than the distance between the tracks 48, which axles are pivotally connected to the links 55 and 56 forming the endless chain passing over the sprocket wheels 57 and wheels 58 at opposite ends of the frame, the wheels 57 being actuated by the chain 28 through the medium of the sprocket wheel 27 driven by the engine, and at the outer ends of the axles the buckets 55' are rigidly fastened thereto. The wheels 58 arranged at one end of the frame are supported by supporting bars 58' projecting from the frame and are adjusted so that the endless chain may be tightened by means of the adjusting screws 59' bearing against the portion 60' connected to the parallel plates. Arranged between the plates 45 are the threaded bolts (49) secured in position by nuts (50) upon which is a track (51) composed of a pair of angle irons extending the entire length of the lower portion of the frame and at least substantially one-third the length of the top of the frame around one end thereof to prevent the disengagement of the buckets from the tracks over which they travel when the buckets are in an inverted position, suitable means such as antifrictional wheels 59ᵃ being connected to the axles (54) carried by each bucket by the members (60), and riding upon the angle irons constituting the tracks therefor.

Intermediate the ends of several of the axles and corresponding in number to the number of scraping buckets are the wheels 59ᵃ engaging the different portions of the track member 51, each pair of wheels being connected together by a connecting member 60 fastened to the axle 54 and moving with the conveyer. These wheels 59ᵃ prevent any rising of the scraper 55' on the track during the operation of the device which ordinarily occurs when the scrapers engage the earth causing the chain to disengage the sprocket wheels, the scrapers being preferably in the form of buckets rigidly held to the endless conveyer in the manner as above described. The operating chains are arranged between the outer portion of each wheel and the sides of the buckets and attached to the axles 54.

The sides of the buckets at their outer portions each carry a cutting implement 61' of a curved formation, having its outer edge sharpened, the implement being disposed parallel with the sides of the bucket and adapted to engage and enter the earth a slight distance below the bucket bottom. The cutters have their sharpened portions vertically disposed and are provided with extended curved shank portions 61ᵃ projecting around each bucket, and the ends of the curved implements substantially overlie the entrance to each bucket. The curved shank portions on their inner faces each carry rollers 62 journaled thereon in suitable brackets and engage the track portion 63 composed of metal arranged on the outside of the plate 45. The track extends entirely around the plate and constitutes a support for the cutting portion of each implement, due to the fact that the same is engaged by the anti-friction rollers 62 carried by the curved shank portions of the knives.

Having thus described the invention the operation is as follows:

When it is desired to transport the machine from place to place, the cutters remaining inactive, the clutch members 10' and 13' are coupled causing the actuation of the truck wheels 3 through the medium of the driving mechanism above described, thus moving the supporting truck in a forward position. When the machine is placed in operation the clutch members 10 and 13 are coupled, clutches 10' and 13' being uncoupled, this through the medium of the beveled gears and transmission causing the truck to move rearwardly, at the same time imparting a rotary action to the endless conveyer carrying the scraping buckets 55', that pass transversely across the road to the center thereof, it being apparent that the machine is propelled at a predetermined rate of speed by means of the transmission heretofore described, while the cutters are in operation.

Having thus described the invention what I claim is:

1. In a machine of the class described, the combination of a supporting truck of a scraping frame mounted thereon, a series of track extending therearound, scrapers movable over said scraping frame, a cutting member carried by each of said scrapers and provided with a shank having a roller member disposed upon its inner side and in engagement with the track on the frame and means for operating said scrapers.

2. In a machine of the class described, the combination with a supporting truck with a scraping frame mounted thereon, having a track composed of sheet metal extending therearound, a series of scrapers movable over said scraping frame, a cutting member carried by each of said scrapers and provided with a forwardly extending curved shank portion having a wheel projecting from one side thereof and journaled within the area described by the borders of said shank portion and engaging the track on the frame, and means for operating said scrapers.

3. In a machine of the class described, the combination with a supporting truck of guiding members composed of spaced vertically extending standards arranged thereon, a scraping frame, scrapers movable over said frame, the said frame having supporting members passing between the spaced standards, rollers carried by said supporting members and engaging the spaced standards on one side, the scraping frame being provided with a relatively wide roller journaled thereon, adapted to ride upon the opposite side of both of said standards, and means coöperating with the guiding frame and the supporting members for raising and lowering the scraping frame, and means for imparting motion to the scrapers.

4. In a machine of the class described, the combination with a supporting truck, of a scraping frame carried thereby, an endless conveyer traversing said frame and provided with portions engaging the edges thereof, means for imparting motion to said conveyer, a member depending from each scraper, a track arranged within the frame and coöperating with said depending members carried by the scrapers, the said track extending entirely across the lower portion of the frame and part way over the upper portion thereof, for the purpose described.

5. In a machine of the class described, the combination with a supporting truck, of a scraping frame attached thereto, an endless conveyer traversing said frame and provided with scrapers, wheels carried by said scrapers and engaging the edges of the frame, and an engaging member depending from each bucket having a wheel attached on each side thereof, a track within the frame composed of opposed angle members, a portion thereof contacting with the wheels on the engaging members depending from the scrapers, the said track extending entirely over the lower portion of the frame and a portion of the way over the top of the frame.

6. In a machine of the class described, the combination with a supporting truck, of a transverse frame thereon, a series of scrapers movable over said frame, a cutting implement carried by one of said scrapers and provided with an upwardly extending curved shank portion bearing on its inner face an antifriction member engaging the frame for rigidly supporting and maintaining the cutting implement in position, and means for shifting the scrapers.

7. In a machine of the class described, the combination of a supporting truck, having a frame thereon, a continuous track arranged around said frame on one side thereof, a series of scrapers movable over the frame, cutting implements carried by said scrapers, each cutting implement being provided with an elongated shank, a roller bearing disposed on the inner face of said shank and contacting with the track around the frame, and means for operating said scraper.

8. In a machine of the class described, the combination with a supporting truck, having a frame thereon, a continuous track arranged around said frame on one side thereof, a series of scrapers movable over the frame, cutting implements carried by said scrapers, each cutting implement being provided with an elongated curved shank having its end overlying the entrance to its scraper, a roller bearing disposed on the inner face of said shank and contacting with the track extending around the frame, and means for operating said scraper.

9. In a road scraping machine, the combination with a supporting truck, of a frame carried thereby and extending beyond one side of the truck and transversely of the road, said frame having an inclined portion at one end while the major portion thereof occupies a horizontal position, a series of scrapers movable over said frame for acting upon the road and transferring a portion of the material constituting the road from one side to the center thereof to elevate the center of the road, means for actuating said scraper.

10. In a road scraping machine, a supporting truck, a frame carried thereby and extending transversely of the road, said frame having a horizontal portion constituting the major part thereof, and a portion inclining to the horizontal at one end, scraping devices movable over said frame, said scraping devices being adapted to transfer material from one side of the road to the center thereof to elevate the same, and means for moving said scraping devices.

11. In a road-scraping machine, a supporting truck, a frame carried thereby and adapted to extend transversely of the road, road treating elements, movable over said frame, said frame having a horizontal portion constituting the major portion thereof and a portion inclined to the horizontal near one end for the purpose described.

In testimony whereof I hereunto affix my signature in the presence of two witnesses.

CLAY ALLEN.

Witnesses:
F. M. Conwell,
W. R. Phipps.

Copies of this patent may be obtained for five cents each, by addressing the "Commissioner of Patents, Washington, D. C."